(12) United States Patent
Ishida

(10) Patent No.: US 6,676,006 B2
(45) Date of Patent: Jan. 13, 2004

(54) FLUX SUPPLY DEVICE IN WHICH LIQUID FLUX IS SUPPLIED THROUGH LIQUID HOLDING PORTION, AND LIQUID FLUX SUPPLY METHOD

(75) Inventor: Kazutaka Ishida, Osaka (JP)

(73) Assignee: Daishin Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/885,447

(22) Filed: Jun. 21, 2001

(65) Prior Publication Data
US 2002/0017552 A1 Feb. 14, 2002

(30) Foreign Application Priority Data
Jul. 10, 2000 (JP) ........................................ 2000-207668

(51) Int. Cl.[7] .............................. B23K 1/00; B23K 5/00; B23K 20/14
(52) U.S. Cl. ............................... 228/42; 228/39; 228/8
(58) Field of Search ............................. 228/33, 42, 43, 228/39, 8, 207

(56) References Cited

U.S. PATENT DOCUMENTS

| | | | | |
|---|---|---|---|---|
| 3,876,853 A | * | 4/1975 | Takahashi et al. | 219/73 |
| 4,153,832 A | * | 5/1979 | Iio et al. | 219/124.34 |
| 4,197,116 A | * | 4/1980 | Kolb | 75/387 |
| 4,327,798 A | * | 5/1982 | McCauley et al. | 164/56.1 |
| 5,003,149 A | * | 3/1991 | Varenchuk et al. | 219/73.2 |
| 5,671,773 A | * | 9/1997 | Park | 137/386 |
| 5,731,518 A | * | 3/1998 | Willemen | 73/438 |

FOREIGN PATENT DOCUMENTS

| | | |
|---|---|---|
| EP | 0 267 068 A | 5/1988 |
| JP | 08 033975 A | 2/1996 |
| JP | 08-033975 | 2/1996 |
| JP | 09-164356 | 6/1997 |
| JP | 11005157 A | 1/1999 |
| JP | 11051372 A | 2/1999 |

* cited by examiner

Primary Examiner—M. Alexandra Elve
Assistant Examiner—Colleen P. Cooke
(74) Attorney, Agent, or Firm—Rabin & Berdo, P.C.

(57) ABSTRACT

A flux supply device comprises a liquid replenishing portion containing a liquid flux for replenishment, a liquid holding portion connected to the lower end of the liquid replenishing portion with a first electromagnetic valve provided therebetween, and a liquid supply portion connected to the lower end of the liquid holding portion with a second electromagnetic valve provided therebetween. The lower end of the liquid supply portion is located in a flux storage tank in which a mixed gas is generated. A gas blow-in pipe for supplying a combustible gas is also located in the flux storage tank. The first electromagnetic valve and the second electromagnetic valve are controlled in given timing so that one opens and closes and then the other opens and closes, alternately and repeatedly. This prevents the pressure variation in the flux storage tank from affecting the liquid replenishing portion and the surface level of the liquid flux in the flux storage tank is kept unchanged.

13 Claims, 8 Drawing Sheets

FLUX SUPPLY DEVICE IN WHICH LIQUID FLUX IS SUPPLIED THROUGH LIQUID HOLDING PORTION, AND LIQUID FLUX SUPPLY METHOD

BACKGROUND OF THE INVENTION

1. Field of the Invention

The present invention relates to a flux supply device, and particularly to a flux supply device and a liquid flux supply method for supplying a mixed gas to a brazing apparatus.

2. Description of the Background Art

FIG. 8 is a diagram schematically showing the structure of a conventional brazing apparatus.

Referring to FIG. 8, the flux storage tank 11, shaped like a bottle having an observation hatch 13, contains about 1.5 liters of liquid flux 15. A gas blow-in pipe 18 is attached to the lid 14 of the flux storage tank 11, with the lower end of the gas blow-in pipe 18 located below the surface level $S_1$ of the liquid flux 15. The gas blow-in pipe 18 is connected through a gas pipe 19 and a manual valve 70 to a combustible gas cylinder 67 charged with a combustible gas such as propane, acetylene, etc.

In the use of the gas flux, the liquid flux 15 in the flux storage tank 11 diminishes. Therefore a liquid flux replenishing device is provided to replenish the liquid flux. This liquid flux replenishing device includes a replenishing tank 25 as its major component. That is to say, the liquid flux replenishing device is composed of: the replenishing tank 25 containing the liquid flux 15; a first pipe 41 connected to the opening 26 of the replenishing tank 25; a first manual valve 31 connected to the lower end of the first pipe 41; a second pipe 42 connected to the lower end of the first manual valve 31; a cam lock coupling 32 allowing the second pipe 42 to be attached and removed; a third pipe 65 connected to the lower end of the cam lock coupling 32; a second manual valve 35 connected to the lower end of the third pipe 65; and a liquid flux supply pipe 17 connected to the lower end of the second manual valve 35 and disposed to protrude in the flux storage tank 11 through the lid 14.

When the first and second manual valves 31 and 35 are both opened, the liquid flux 15 contained in the replenishing tank 25 is supplied into the flux storage tank 11 through the first pipe 41, second pipe 42, third pipe 65, and liquid flux supply pipe 17. The surface level $S_1$ of the liquid flux 15 in the flux storage tank 11 is thus defined by the position of the lower end of the liquid flux supply pipe 17.

An outlet 21 is attached to the lid 14 of the flux storage tank 11 to send out the mixed gas produced in the flux storage tank 11, and a mixed gas pipe 20 is connected to the outlet 21 and to an automatic brazing apparatus 76 via a manual valve 72.

The automatic brazing apparatus 76 is connected to a burning-supporting gas cylinder 68 charged with a burning-supporting gas such as oxygen through a burning-supporting gas pipe 74 and a manual valve 73.

Next, the use of this flux supply device is described.

When using the automatic brazing apparatus 76, the manual valves 70 and 72 are opened to supply the mixed gas composed of the gas flux produced through vaporization (gasification) of the liquid flux 15 in the flux storage tank 11 and the combustible gas from the combustible gas cylinder 67 to the automatic brazing apparatus 76 through the mixed gas pipe 20. The manual valve 73 is also opened to supply the burning-supporting gas in the burning-supporting gas cylinder 68 to the automatic brazing apparatus 76 through the burning-supporting gas pipe 74.

The combustible gas supplied from the combustible gas cylinder 67 is discharged into the liquid flux 15 in the flux storage tank 11 from the lower end of the gas blow-in pipe 18. This discharge causes part of the liquid flux 15 to vaporize to produce the gas flux, which forms the mixed gas in the flux storage tank 11 together with the combustible gas supplied from the gas blow-in pipe 18.

This mixed gas is sent out from the flux storage tank 11 through the outlet 21 and supplied to the automatic brazing apparatus 76 through the mixed gas pipe 20. When the automatic brazing apparatus 76 is in operation, the liquid flux 15 stored in the flux storage tank 11 vaporizes and thus gradually diminishes. Hence, in order to fill up the reduction of the liquid flux 15, the first and second manual valves 31 and 35 of the liquid flux replenishing device are kept open.

Accordingly, as the liquid flux 15 in the flux storage tank 11 diminishes and its surface level $S_1$ lowers, the liquid flux 15 contained in the replenishing tank 25 is soon supplied into the flux storage tank 11 through the liquid flux supply pipe 17. Thus, as long as the liquid flux 15 is contained in the liquid flux replenishing device, the surface level $S_1$ of the liquid flux 15 in the flux storage tank 11 is always kept unchanged, so that the mixed gas can be continuously supplied to the automatic brazing apparatus 76.

When the liquid flux 15 contained in the liquid flux replenishing device runs low, the replenishing tank 25 must be replaced by a new one. For the replacement, first, the first manual valve 31 and the second manual valve 35 are both closed. Next, the cam lock coupling 32 is operated to separate the second pipe 42 and the components attached on it from the cam lock coupling 32. In this condition, the first manual valve 31 is closed, so that the liquid flux, possibly remaining in the first pipe 41 etc., will not leak out.

Then the opening 26 of the replenishing tank 25 is removed from the first pipe 41 and a new replenishing tank 25 filled with the liquid flux 15 is connected to the first pipe 41. The cam lock coupling 32 is then operated to connect the second pipe 42 to the cam lock coupling 32, and then the first manual valve 31 and the second manual valve 35 are both opened. The liquid flux 15 in the new replenishing tank 25 is thus supplied into the flux storage tank 11 through the liquid flux supply pipe 17, so that the mixed gas can always be supplied continuously to the automatic brazing apparatus 76 from the flux storage tank 11.

The above-described conventional flux supply device encounters no particular problem during ordinary operation of the automatic brazing apparatus 76. However, a problem arises when the brazing work with the automatic brazing apparatus 76 is stopped at the end of the working hours or when the automatic brazing apparatus 76 is started on the next day, for example.

For example, when the brazing work is finished at the end of the working hours, the operation of the automatic brazing apparatus 76 is stopped and the manual valves 70, 72 and 73 are closed. On the next day, when the manual valves 70, 72 and 73 are opened to use the automatic brazing apparatus 76, the surface level $S_1$ of the liquid flux 15 in the flux storage tank 11 may considerably vary.

Now the pressure equilibrium condition between the liquid flux 15 in the flux storage tank 11 and the liquid flux 15 in the replenishing tank 25 is described first. When the pressure in the space above the liquid flux 15 in the flux storage tank 11 is taken as $P_1$ (normally 1 Kg/cm² or lower), the pressure in the space above the liquid flux 15 in the replenishing tank 25 as $P_2$, the vertical distance between the surface level $S_1$ of the liquid flux 15 in the flux storage tank 11 and the surface level $S_2$ of the liquid flux 15 in the replenishing tank 25 as H, the density of the liquid flux 15 as ρ, and the acceleration of gravity as ρ, then $$P_1 = H\rho g + P_2$$

The condition at the beginning of the operation as described on the above is now considered on the basis of this equation. First, when the manual valve 70 is opened at the beginning of operation, the pressure $P_1$ in the flux storage tank 11 rises as the combustible gas is discharged through the gas blow-in pipe 18. This forces the vertical distance H to increase in the equation above, and as a result the liquid flux 15 in the flux storage tank 11 will go up in the liquid flux supply pipe 17 to raise the surface level $S_2$ of the liquid flux 15 in the replenishing tank 25. While the liquid flux supply pipe 17 is usually filled with new liquid flux 15 supplied from the replenishing tank 25, the old liquid flux 15 stored in the flux storage tank 11 mixes in it.

Next, the manual valve 72 is opened in this condition. When the manual valve 72 is opened, the mixed gas produced in the flux storage tank 11 is rapidly supplied to the automatic brazing apparatus 76 through the mixed gas pipe 20. This decreases the pressure $P_1$ in the flux storage tank 11. Then the distance H will decrease in the equation above. That is to say, in this condition, the surface level $S_2$ of the liquid flux 15 in the replenishing tank 25 lowers, which forces part of the liquid flux 15 into the flux storage tank 11 through the liquid flux supply pipe 17. Then the surface level $S_1$ of the liquid flux 15 in the flux storage tank 11 goes up. The pressure $P_2$ in the replenishing tank 25 may become negative and then the replenishing tank 25 may be dented.

When the surface level $S_1$ in the flux storage tank 11 varies as explained above, the distance between the surface level $S_1$ and the lower end of the gas blow-in pipe 18 through which the combustible gas is discharged varies, which varies the amount of discharged combustible gas. It is then difficult to supply the automatic brazing apparatus 76 with the mixed gas at stable concentration.

Furthermore, since the replenishing tank 25 is closed to the outside, the pressure $P_2$ in the space in it becomes negative when the liquid flux 15 moves downward. This may dent the body of the replenishing tank 25, and then the pressure $P_2$ varies to cause the distance H to vary in the equation shown above. As a result, the surface level $S_1$ in the flux storage tank 11 will vary, too.

The variation of the surface level is caused not only at the end or beginning of the operation, but the pressure $P_1$ in the flux storage tank 11 is varied also by variation of the flow rate of the mixed gas or variation of the atmospheric temperature etc. during the operation of the automatic brazing apparatus 76, and as a result the surface level $S_1$ will vary. It is therefore difficult for the conventional flux supply device to constantly supply the mixed gas at stable pressure and stable concentration, leading to deterioration of the brazing quality of the brazing apparatus.

SUMMARY OF THE INVENTION

An object of the present invention is to stably supply a liquid flux into a flux storage tank even when the pressure in the flux storage tank is varied.

Another object of the present invention is to provide a flux supply device and a liquid flux supply method which suppress the variation of the surface level in the flux storage tank.

To achieve the objects above, a first aspect of the present invention is directed to a flux supply device for supplying a mixed gas composed of a gas flux and a combustible gas to a brazing apparatus, where the flux supply device comprises: a flux storage tank for storing a liquid flux; a gas blow-in pipe for blowing the combustible gas into the liquid flux stored in the flux storage tank; a liquid flux supply pipe for supplying the liquid flux into the flux storage tank, the liquid flux supply pipe having its lower end located above the lower end of the gas blow-in pipe; a liquid replenishing portion for holding the liquid flux, the liquid replenishing portion being located above the liquid flux supply pipe and having its lower end opened; a first automatically opened/closed valve connected to the lower end of the liquid replenishing portion; a second automatically opened/closed valve connected to the upper end of the liquid flux supply pipe; a liquid holding portion for holding the liquid flux, the liquid holding portion being connected between the lower end of the first automatically opened/closed valve and the upper end of the second automatically opened/closed valve; and a control portion for controlling the first automatically opened/closed valve and the second automatically opened/closed valve so that one automatically opens and closes and then the other automatically opens and closes, alternately and repeatedly.

With this structure, at least one of both ends of the liquid holding portion is always closed by the first automatically opened/closed valve or the second automatically opened/closed valve.

According to a flux supply device of a second aspect of the present invention, in the structure of the first aspect, the control portion provides control so that the amount of the liquid flux that can be supplied from the liquid holding portion into the liquid flux supply pipe while the first automatically opened/closed valve and the second automatically opened/closed valve are opened and closed in a given time period is larger than the amount of the liquid flux consumed while the mixed gas is sent out from the flux storage tank in the given time period.

With this structure, the liquid flux is always contained in the liquid flux supply pipe.

According to a flux supply device of a third aspect of the invention, in the structure of the second aspect, the control portion can change the timing for opening and closing the first automatically opened/closed valve and the second automatically opened/closed valve.

With this structure, the amount of liquid flux supplied into the flux storage tank can be easily adjusted in accordance with the variation of the amount of mixed gas that the flux supply device supplies.

According to a flux supply device of a fourth aspect of the invention, in the structure of any of the first to third aspects, the control portion provides control so that a given time passes from when one of the first automatically opened/closed valve and the second automatically opened/closed valve is closed to when the other is opened.

With this structure, both ends of the liquid holding portion are completely closed for the given time period.

A fifth aspect of the invention is directed to a flux supply device for supplying a mixed gas composed of a gas flux and a combustible gas to a brazing apparatus, where the flux supply device comprises: a flux storage tank for storing a liquid flux; a gas blow-in pipe for blowing the combustible gas into the liquid flux stored in the flux storage tank; a liquid flux supply pipe for supplying the liquid flux into the flux storage tank, the liquid flux supply pipe having its lower end located above the lower end of the gas blow-in pipe; a liquid replenishing portion for holding the liquid flux, the liquid replenishing portion being located above the liquid flux supply pipe and having its lower end opened; a rotary valve connected between the upper end of the liquid flux supply pipe and the lower end of the liquid replenishing portion; and a control portion for providing control to rotate the rotary valve so that an open hole formed in the body of the rotary valve alternately communicates with the liquid flux supply pipe and the liquid replenishing portion.

With this structure, the liquid replenishing portion and the liquid flux supply pipe are not allowed to directly communicate with each other.

According to a flux supply device of a sixth aspect of the invention, in the structure of the fifth aspect, the control portion provides control so that the amount of the liquid flux that can be supplied from the open hole into the liquid flux supply pipe while the rotary valve rotates in a given time period is larger than the amount of the liquid flux consumed while the mixed gas is sent out from the flux storage tank in the given time period.

With this structure, the liquid flux is always contained in the liquid flux supply pipe.

A seventh aspect of the present invention is directed to a liquid flux supply method for use with a flux supply device for supplying a mixed gas of a gas flux and a combustible gas to a brazing apparatus, wherein a liquid flux held in a liquid replenishing portion located above a storage tank storing the liquid flux is supplied into the storage tank through a liquid holding portion which is controlled so that its one end automatically opens and closes and then the other end automatically opens and closes, alternately and repeatedly.

With this structure, the variation of pressure in the storage tank does not affect the liquid replenishing portion.

As stated above, according to the flux supply device of the first aspect, at least one of both ends of the liquid holding portion is always closed, so that the liquid replenishing portion is not affected even if the pressure in the flux storage tank varies, and the liquid flux can be stably supplied into the flux storage tank. This suppresses the variation of the surface level of the liquid flux stored in the flux storage tank.

According to the flux supply device of the second aspect, in addition to the effect of the first aspect, the liquid flux is always contained in the liquid flux supply pipe and the surface level of the liquid flux stored in the flux storage tank can be kept unchanged even when the amount of the used mixed gas varies. Therefore the mixed gas can always be stably supplied to the brazing apparatus to enhance the reliability of the apparatus.

According to the flux supply device of the third aspect, in addition to the effect of the second aspect, the amount of liquid flux supplied into the flux storage tank can be easily adjusted in accordance with the amount of consumed mixed gas, thus providing greater convenience.

According to the flux supply device of the fourth aspect, in addition to the effect of any of the first to third aspects, both ends of the liquid holding portion are completely closed for a given time period, which completely prevents the pressure variation in the tank from affecting the liquid replenishing portion, thus providing improved reliability.

According to the flux supply device of the fifth aspect, the liquid replenishing portion and the liquid flux supply pipe do not directly communicate with each other, so that the liquid flux can be stably supplied into the flux storage tank even if the pressure in the flux storage tank or the liquid replenishing portion varies. This suppresses the variation of the surface level of the liquid flux stored in the flux storage tank.

According to the flux supply device of the sixth aspect, in addition to the effect of the fifth aspect, the liquid flux is always contained in the liquid flux supply pipe, and the surface level of the liquid flux stored in the flux storage tank can be kept unchanged even when the amount of used mixed gas varies. Therefore the mixed gas can always be stably supplied to the brazing apparatus to improve the reliability.

According to the flux supply method of the seventh aspect, the variation of pressure in the storage tank does not affect the liquid replenishing portion, so that the liquid flux can be stably supplied. This suppresses the variation of the surface level of the liquid flux stored in the flux storage tank.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
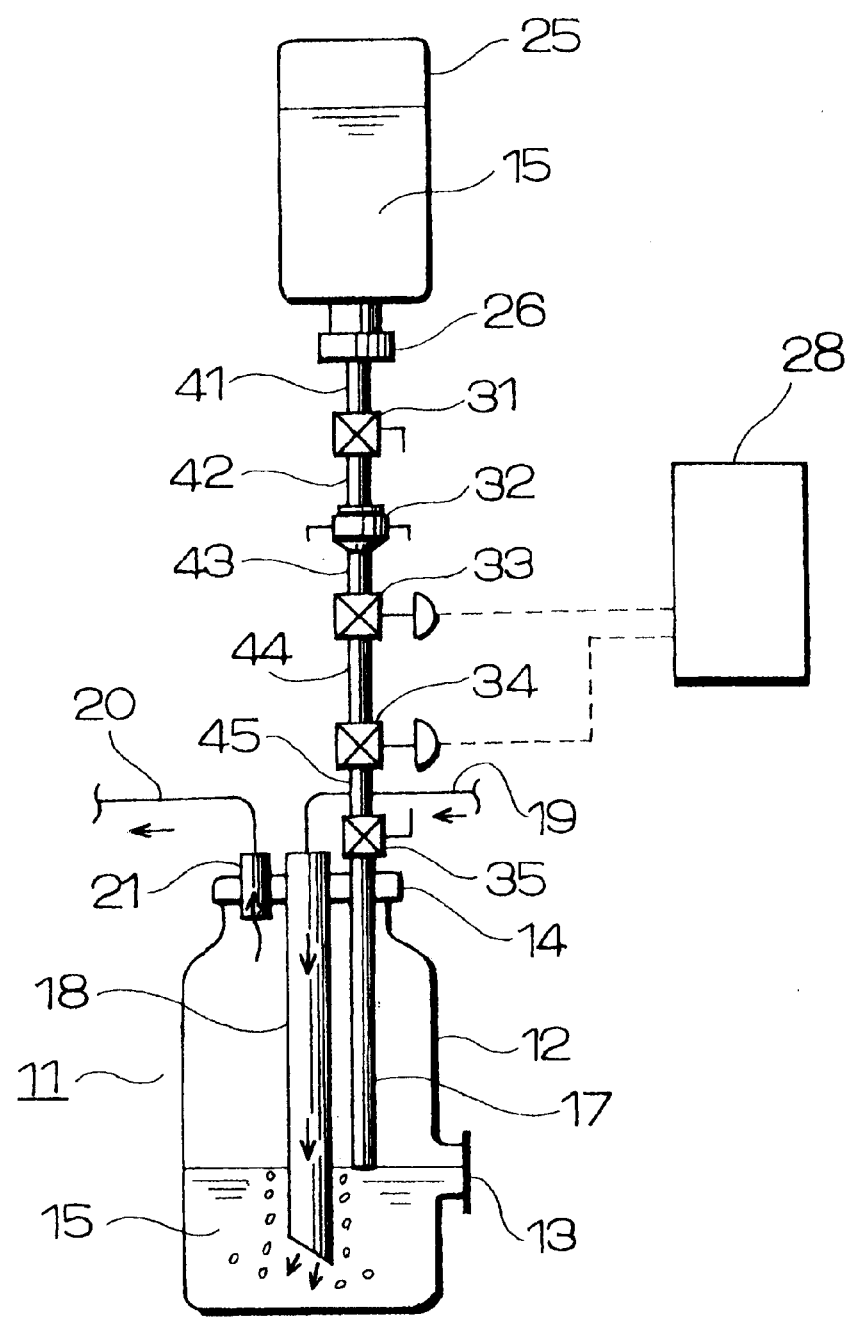
FIG. 1 is a diagram schematically showing the structure of a flux supply device according to a first embodiment of the present invention.

FIG. 1 is a diagram schematically showing the structure of a flux supply device according to a first embodiment of the present invention.

Referring to FIG. 1, the flux storage tank 11 is shaped like a bottle and its body 12 has a window 13 to allow the surface level of the stored liquid flux 15 to be seen from outside. A lid 14 is attached to the opening at the upper end of the body 12 to shut off the interior of the flux storage tank 11 from the outside.

Figure 8:
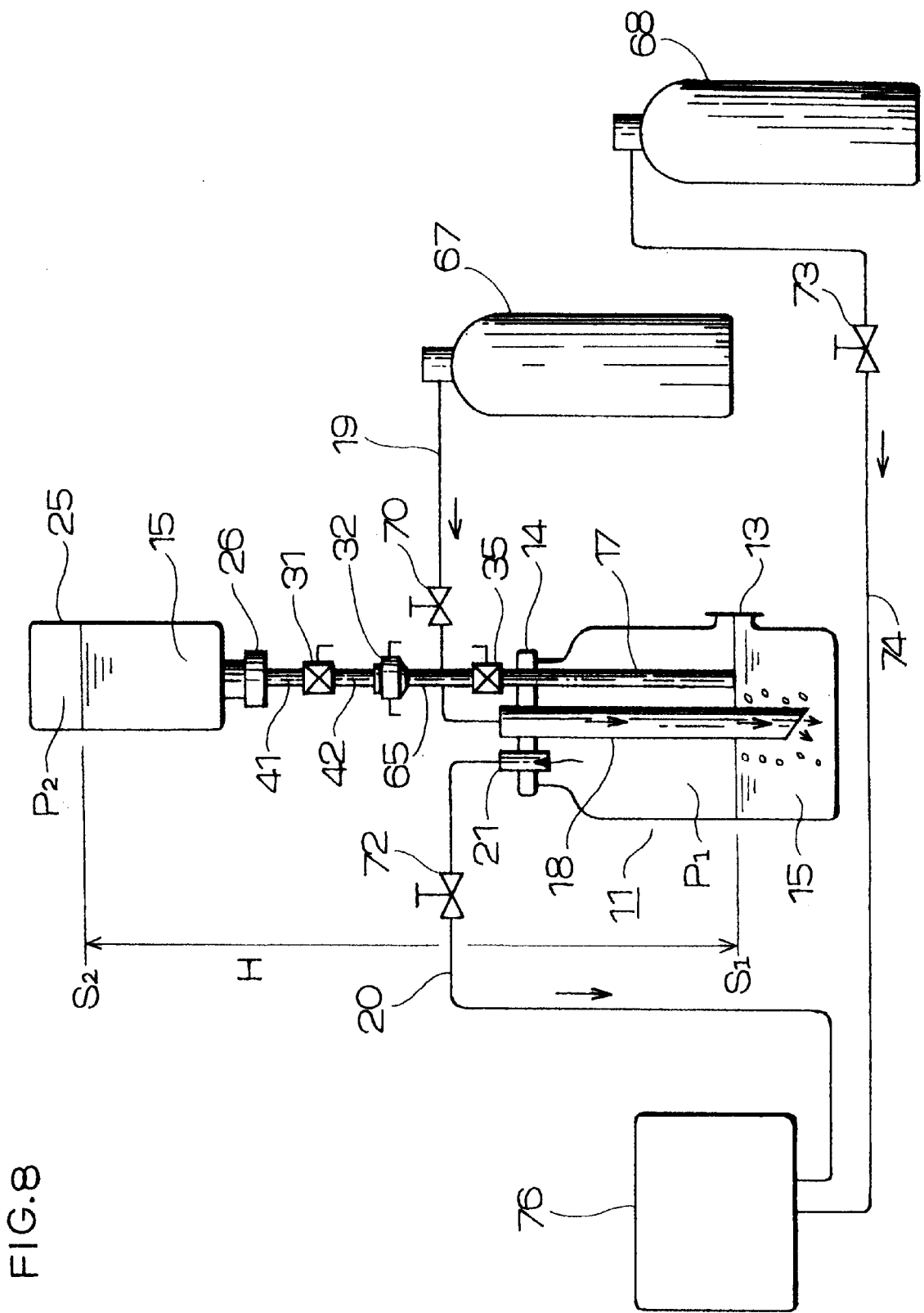
FIG. 8 is a diagram schematically showing the structure of a conventional flux supply device.

A gas blow-in pipe 18 is attached in the center of the lid 14 and connected to a gas pipe 19 for supplying a combustible gas from a combustible gas cylinder not shown. An outlet 21 is attached to another part of the lid 14 and a mixed gas pipe 20 is connected to the outlet 21 to supply the mixed gas produced in the flux storage tank 11 to an automatic brazing apparatus etc. not shown. This flux supply device is basically used with the same peripheral devices as those shown in FIG. 8 in the conventional example.

A liquid flux supply pipe 17 is also attached to the lid 14 to supply the liquid flux into the flux storage tank 11. The liquid flux supply pipe 17 has its lower end located above the lower end of the gas blow-in pipe 18. A replenishing tank 25 charged with liquid flux 15 for replenishment is disposed upside down above the liquid flux supply pipe 17.

A first manual valve 31 is connected to the opening 26 at the lower end of the replenishing tank 25 through a first pipe 41. A second pipe 42 is connected to the lower end of the first manual valve 31 and to a cam lock coupling 32 through which it can be attached/removed. The lower end of the cam lock coupling 32 is connected to a first electromagnetic valve 33 through a third pipe 43. The lower end of the first electromagnetic valve 33 is connected to a second electromagnetic valve 34 through a fourth pipe 44. The lower end of the second electromagnetic valve 34 is connected to a second manual valve 35 through a fifth pipe 45, and the second manual valve 35 is connected to the liquid flux supply pipe 17 mentioned earlier.

The first manual valve 31 and the second manual valve 35 are manually opened and closed. On the other hand, the first electromagnetic valve 33 and the second electromagnetic valve 34 are generally realized with ball valves and controlled by a control unit 28 and opened and closed in given timing as will be fully described later. An automatic opening/closing mechanism with pneumatic valves may be adopted in place of the first electromagnetic valve 33 and the second electromagnetic valve 34.

Figure 2:
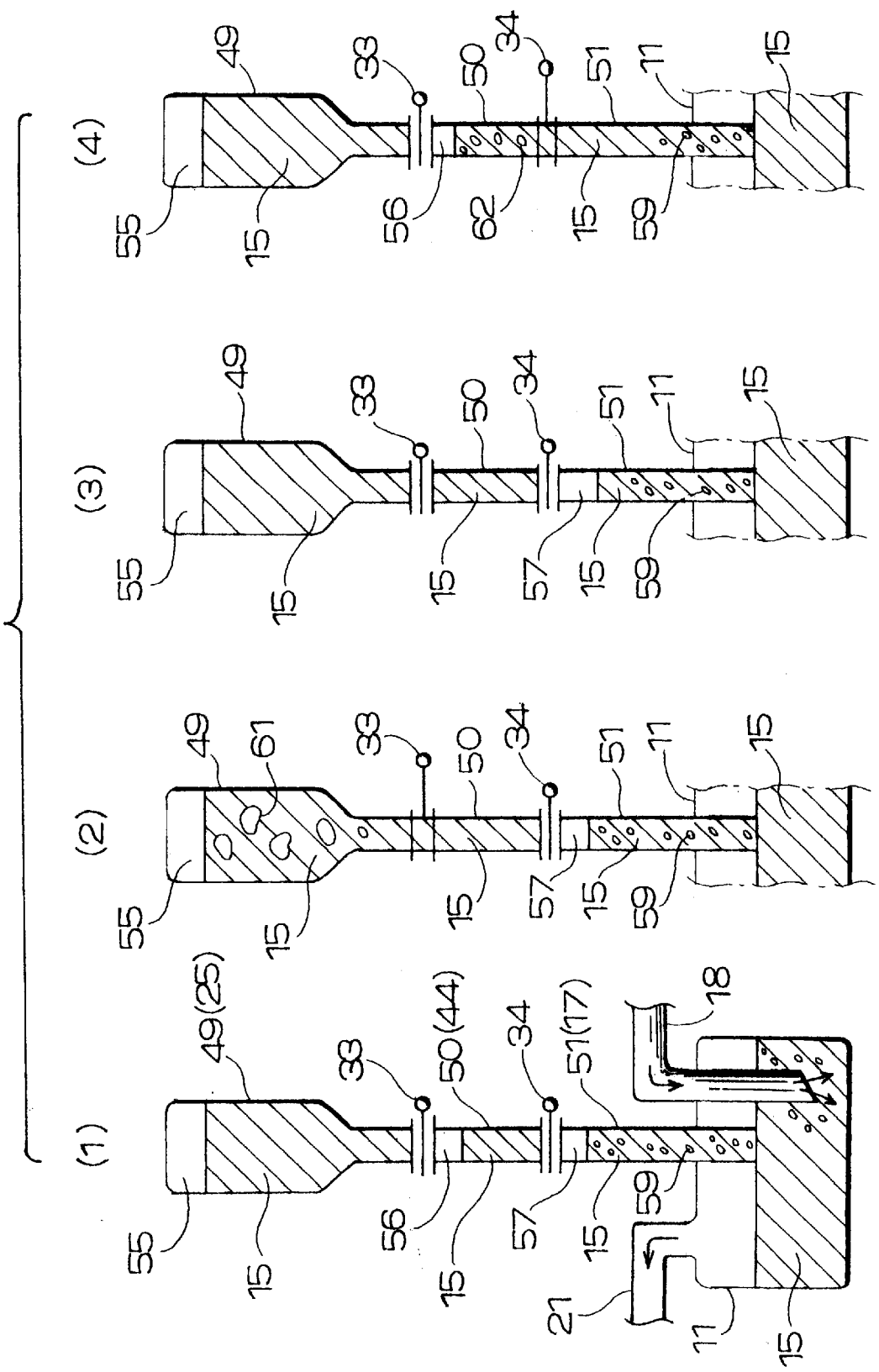
FIG. 2 is a diagram used to explain the principle of the operation of the flux supply device shown in FIG. 1.

Next, the principle of the operation of the flux supply device of this embodiment is explained referring to FIG. 2.

Figure 3:
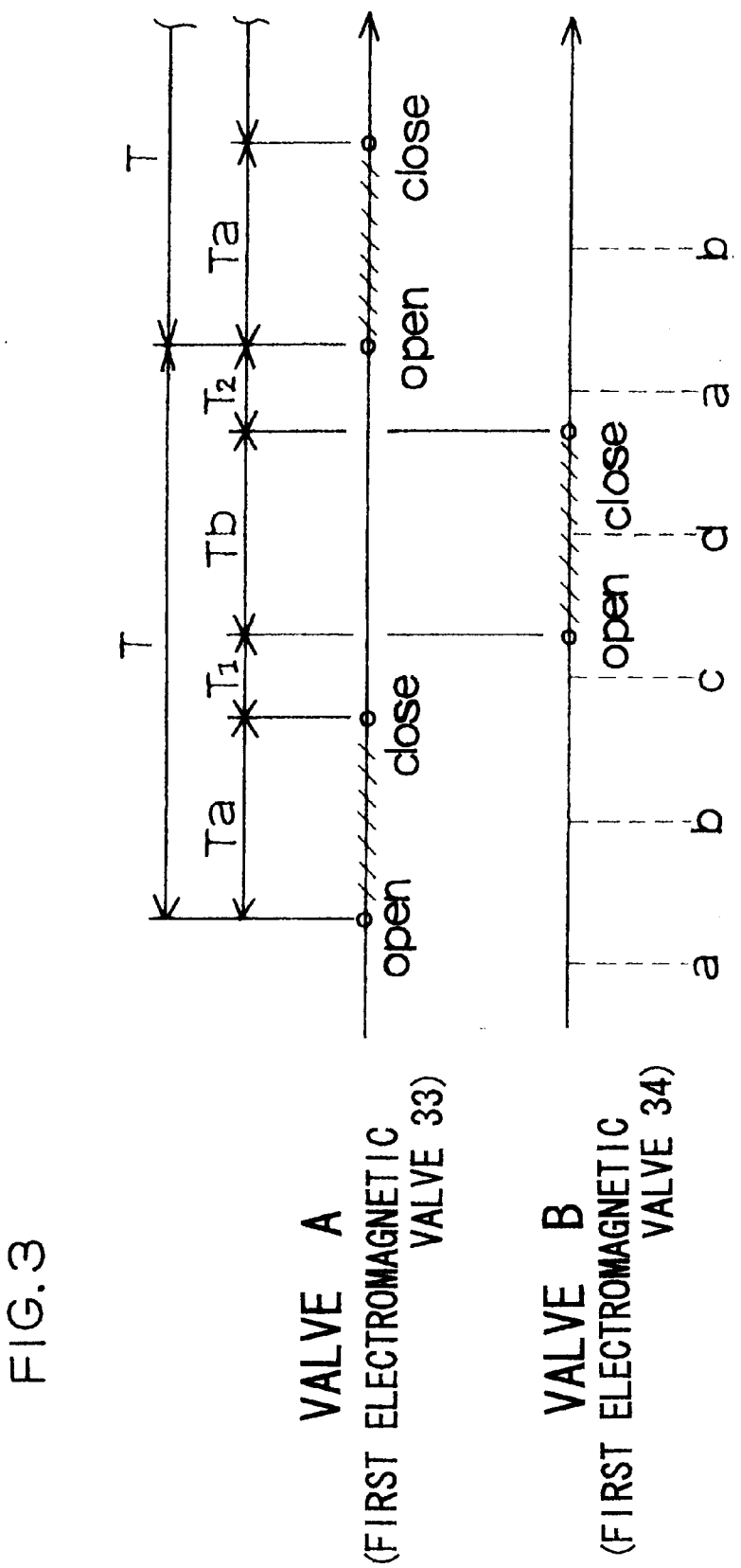
FIG. 3 is a timing chart showing the timing for opening/closing the first electromagnetic valve and the second electromagnetic valve shown in FIG. 2.

FIG. 2 shows the structure of FIG. 1 in a simplified manner. That is to say, the liquid replenishing portion 49 generically represents the replenishing tank 25, opening 26, first pipe 41, first manual valve 31 and second pipe 42 shown in FIG. 1. The liquid holding portion 50 corresponds to the fourth pipe 44 shown in FIG. 1, and the liquid supply portion 51 generically represents the fifth pipe 45, second manual valve 35 and liquid flux supply pipe 17 shown in FIG. 1. Hereinafter the spaces formed in the upper parts of the liquid replenishing portion 49, the liquid holding portion 50 and the liquid supply portion 51 are referred to as first, second and third spaces 55, 56 and 57, respectively. FIG. 3 is a timing chart showing the timing for opening/closing the first electromagnetic valve 33 and the second electromagnetic valve 34 shown in FIG. 1.

In FIG. 2, the condition (1) shows the first use condition. That is to say, in this condition, the first electromagnetic valve 33 and the second electromagnetic valve 34 are both closed. In this condition, the combustible gas is discharged into the liquid flux 15 in the flux storage tank 11 through the gas blow-in pipe 18 and the mixed gas composed of the gas flux produced by vaporization of the liquid flux 15 in the flux storage tank 11 and the supplied combustible gas is being supplied to the brazing apparatus etc. through the outlet 21.

In this case, the liquid flux 15 in the flux storage tank 11 evaporates and its surface level may lower, but the liquid flux 15 held in the liquid supply portion 51 is supplied thereto. Thus, the gas flux enters into the liquid supply portion 51 from its lower end and the bubbles gradually enlarge the third space 57. The surface level of the liquid flux 15 in the flux storage tank 11 is kept unchanged. This condition corresponds to the time "a" in FIG. 3.

Next, when a given time has passed, the condition is changed as shown in (2) of FIG. 2. That is to say, the first electromagnetic valve 33 is opened with the second electromagnetic valve 34 kept closed. Then the second space 56 in the upper part of the liquid holding portion 50 shown in the condition (1) of FIG. 2 goes up as bubbles 61 in the liquid flux 15 in the liquid replenishing portion 49. The bubbles 61 are then taken in the first space 55 in the liquid replenishing portion 49.

In this condition, as in the condition (1) in FIG. 2, the bubbles 59 form in the liquid supply portion 51 as the liquid flux 15 is consumed in the flux storage tank 11, and therefore the third space 57 gradually expands. The surface level of the liquid flux 15 in the flux storage tank 11 is thus kept unchanged also in this condition. This condition corresponds to the time "b" in FIG. 3.

When a further given time has passed, the condition is changed as shown in (3) of FIG. 2. That is to say, the first electromagnetic valve 33, which has been opened, is closed again, with the second electromagnetic valve 34 still kept closed. In this condition, the second space 56 shown in the condition (1) of FIG. 2 is absent and the liquid holding portion 50 is completely filled with the liquid flux 15. In the flux storage tank 11, the third space 57 expands as stated above, but the surface level of the liquid flux 15 in the flux storage tank 11 is kept unchanged since the liquid flux 15 is still contained in the liquid supply portion 51. This condition corresponds to the time "c" in FIG. 3.

When a further given time has passed, the condition is changed as shown in (4) of FIG. 2. In this condition, the second electromagnetic valve 34, which has been kept closed, is opened, with the first electromagnetic valve 33 kept closed. Then the liquid holding portion 50 and the liquid supply portion 51 communicate with each other and the third space 57 formed in the upper part of the liquid supply portion 51 as shown in the condition (3) of FIG. 2 goes up as bubbles 62 and form the second space 56. In this condition, the liquid supply portion 51 is completely filled with the liquid flux 15, and the surface level of the liquid flux 15 in the flux storage tank 11 is kept unchanged, though the bubbles 59 are produced as the liquid flux 15 in the flux storage tank 11 is consumed. This condition corresponds to the time "d" in FIG. 3.

When a further given time has passed, the second electromagnetic valve 34, which has been opened, is closed again, with the first electromagnetic valve 33 kept closed. That is to say, this condition is the condition (1) in FIG. 2. The condition is thus repeatedly changed from (1) to (4) in FIG. 2 and the surface level of the liquid flux 15 in the flux storage tank 11 is always kept unchanged.

The period of one cycle is now taken as T, and as shown in FIG. 3, the time from when the first electromagnetic valve 33, or a valve A, is opened to when it is closed is taken as Ta, the time from when the valve A is closed to when the second electromagnetic valve 34, or a valve B, is opened is taken as $T_1$, the time from when the valve B is opened to when it is closed is taken as Tb, and the time from when the valve B is closed to when the valve A is opened is taken as $T_2$, then $$T = Ta + T_1 + Tb + T_2.$$

As can be seen from FIG. 3 where the hatching shows the periods in which the valve A is open and the period in which the valve B is open, the valve A and the valve B are not in the opened state at the same time. Therefore, even if the pressure varies in the flux storage tank 11, it does not affect the liquid replenishing portion 49. The intervals at which the valve A and the valve B are opened/closed and the timing for opening/closing them can be freely adjusted by the control portion 28 shown in FIG. 1. The opening/closing timing can thus be controlled in accordance with the variation of the amount of the mixed gas sent out from the flux supply device so that the surface level of the liquid flux 15 can be always kept constant in the flux storage tank 11.

More specifically, as can be clearly seen from the operation principle shown in FIG. 2, the liquid flux 15 is always held in the liquid supply portion 51, though the amount may become small, as long as the amount of the liquid flux 15 that can be supplied from the liquid holding portion 50 into the liquid supply portion 51, which is determined by the timing of opening/closing the first electromagnetic valve 33 and the second electromagnetic valve 34, is larger than the amount of the liquid flux 15 consumed per unit time in the flux storage tank 11. That is to say, the capacity of the liquid holding portion 50 is set equal to or larger than the capacity corresponding to the amount of the liquid flux 15 consumed in the one cycle period T. The surface level of the liquid flux 15 in the flux storage tank 11 can always be kept constant by thus adjusting the timing of opening/closing the first electromagnetic valve 33 and the second electromagnetic valve 34.

As can be seen from this operation principle, it is not always necessary to set a large capacity for the liquid holding portion 50, and the amount of the liquid flux supplied into the liquid supply portion 51 can be easily adjusted by controlling the timing of opening/closing the first electromagnetic valve 33 and the second electromagnetic valve 34.

In the above-described embodiment, the periods $T_1$ and $T_2$ in which the valves A and B are both closed are set as shown in FIG. 3, but these periods are set to enhance the reliability of the device operation and are not always necessary. These periods can be omitted or shortened to shorten the period of one cycle and the amount of the liquid flux supplied from the liquid holding portion 50 into the liquid supply portion 51 can be further increased.

While the liquid holding portion is formed of the fourth pipe 44 in the embodiment above, a container of other shape, e.g. a bottle shape, may be used instead.

While the flux storage tank 11 and the replenishing tank 25 are connected through piping in the embodiment shown above, they may be connected through something like a hose.

Further, while the lower end of the liquid flux supply pipe 17 is shaped flat in the embodiment shown above, it may be obliquely cut like that of the gas blow-in pipe 18.

Figure 4:
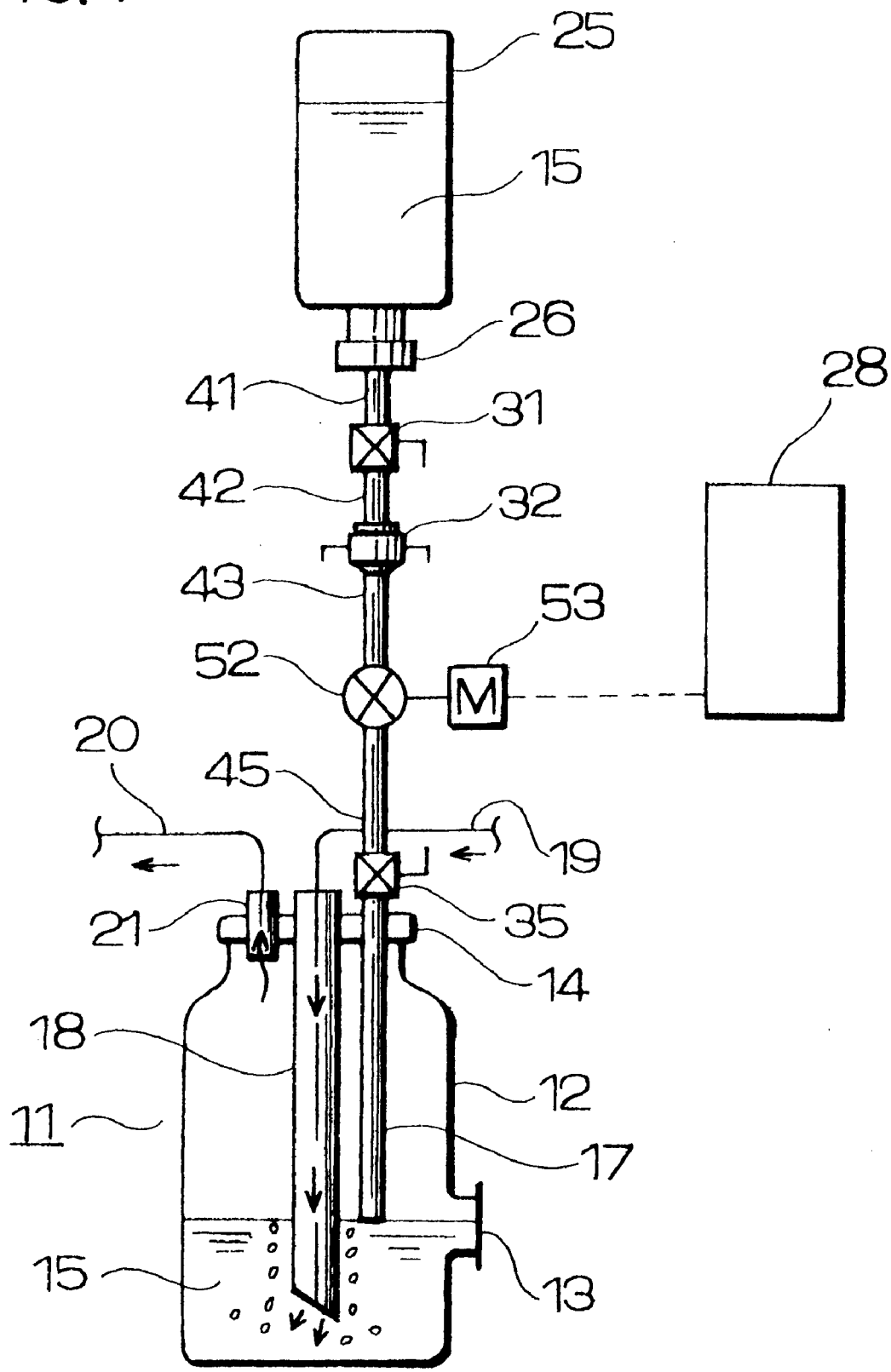
FIG. 4 is a diagram schematically showing the structure of a flux supply device according to a second embodiment of the present invention.

FIG. 4 is a diagram schematically showing the structure of a flux supply device according to a second embodiment of the present invention.

Referring to FIG. 4, this embodiment differs from the first embodiment in that it uses a rotary valve 52 in place of the first electromagnetic valve 33, the fourth pipe 44 and the second electromagnetic valve 34 connected between the third pipe 43 and the fifth pipe 45 in the first embodiment. This rotary valve 52 is driven by a motor 53 whose rotating speed, direction, etc. are controlled by the control portion 28. In other respects, the structure is the same as that shown in the first embodiment and not explained here again.

Figure 5:
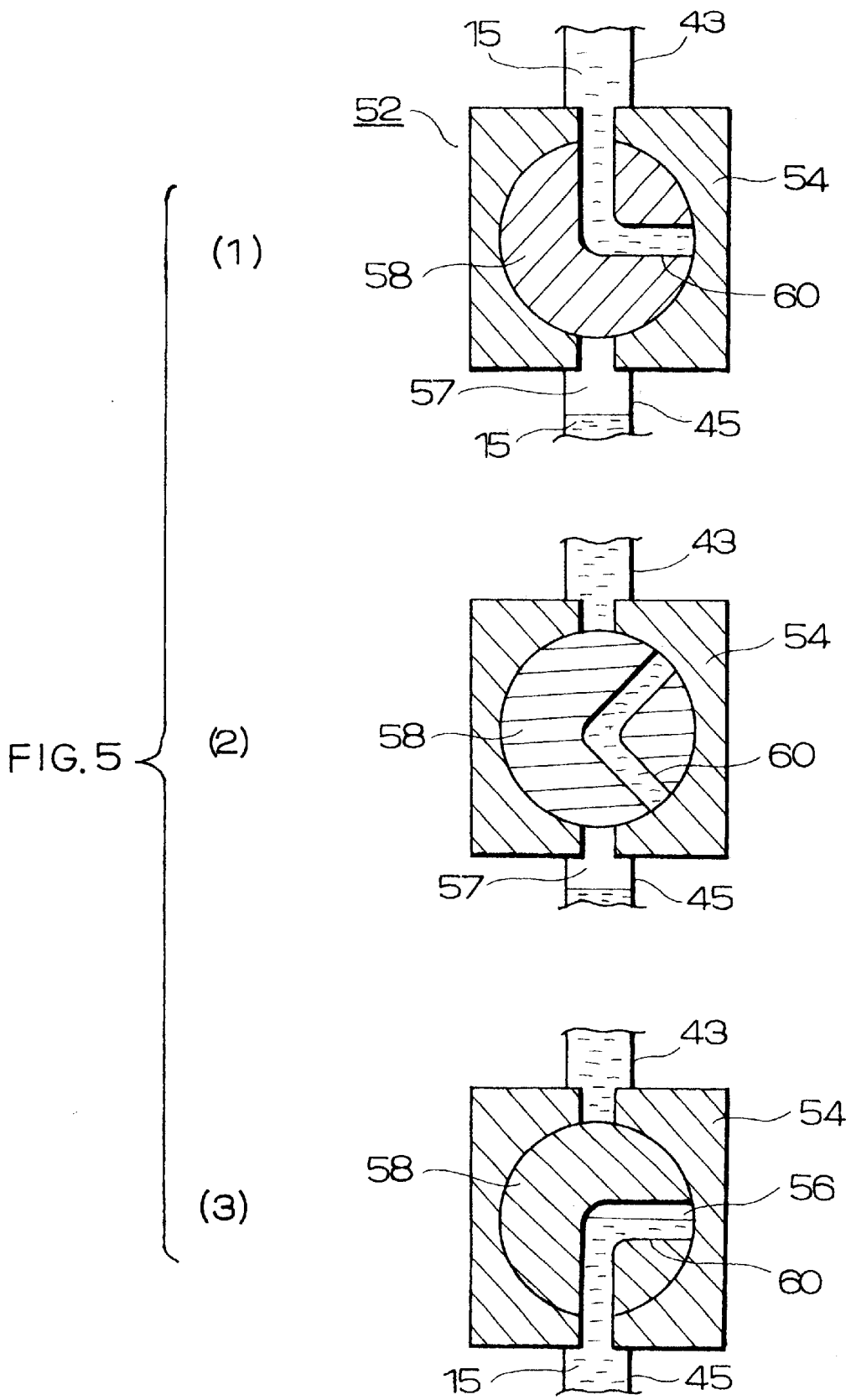
FIG. 5 is a schematic diagram showing the structure of the rotary valve 52 shown in FIG. 4.

FIG. 5 is a diagram schematically showing the rotary valve 52 shown in FIG. 4. This diagram shows how it is operated in use.

Referring to the condition (1) in FIG. 5, the rotary valve 52 has a ball-like or disk-like valve body 58 which rotates on an axis extending perpendicular to the paper of FIG. 5, and a valve box 54 for holding the valve body 58. An L-shaped through hole 60 having openings at both its ends is formed in the valve body 58. In the condition (1) in FIG. 5, one open end of the L-shaped through hole 60 is open into the third pipe 43 and the other is closed, facing on the valve box 54.

In this condition, the flux 15 held in the third pipe 43 fills the L-shaped through hole 60 of the valve body 58. On the other hand, the fifth pipe 45 faces on the valve body 58 where the open ends of the L-shaped through hole 60 are absent. The third space 57 is formed above the flux 15 contained therein.

Then the valve body 58 is driven by the motor 53 and rotated clockwise by about 45° as shown in the condition (2) of FIG. 5. In this condition, the two ends of the L-shaped through hole 60 both face on the closing surface of the valve box 54 and do not communicate with either of the third pipe 43 and fifth pipe 45.

The valve body 58 is then further rotated clockwise by about 45° as shown in the condition (3) in FIG. 5. The other end of the L-shaped through hole 60 formed in the valve body 58 then opens into and communicates with the fifth pipe 45. The gas contained in the third space formed in the fifth pipe 45 shown in the condition (2) of FIG. 5 then goes up in the through hole 60 to form the second space 56.

Next, the valve body 58 is rotated counterclockwise and placed in the condition (1) of FIG. 5 again via the condition (2) of FIG. 5. Then the gas contained in the second space 56 in the L-shaped through hole 60 in the valve body 58 goes up as bubbles in the liquid flux held in the third pipe 43 and is discharged in the space in the replenishing tank 25.

In this way, the liquid flux 15 held in the L-shaped through hole 60 in the valve body 58 can be certainly supplied into the flux storage tank 11, with the third pipe 43 and the fifth pipe 45 completely shut off from each other. The maximum amount of supply is determined by the cycle of rotating the valve body 58 and the capacity of the L-shaped through hole 60.

While the valve body 58 is alternately rotated clockwise and counterclockwise in the embodiment above, the same effect can be obtained when it is continuously rotated in one direction.

Figure 6:
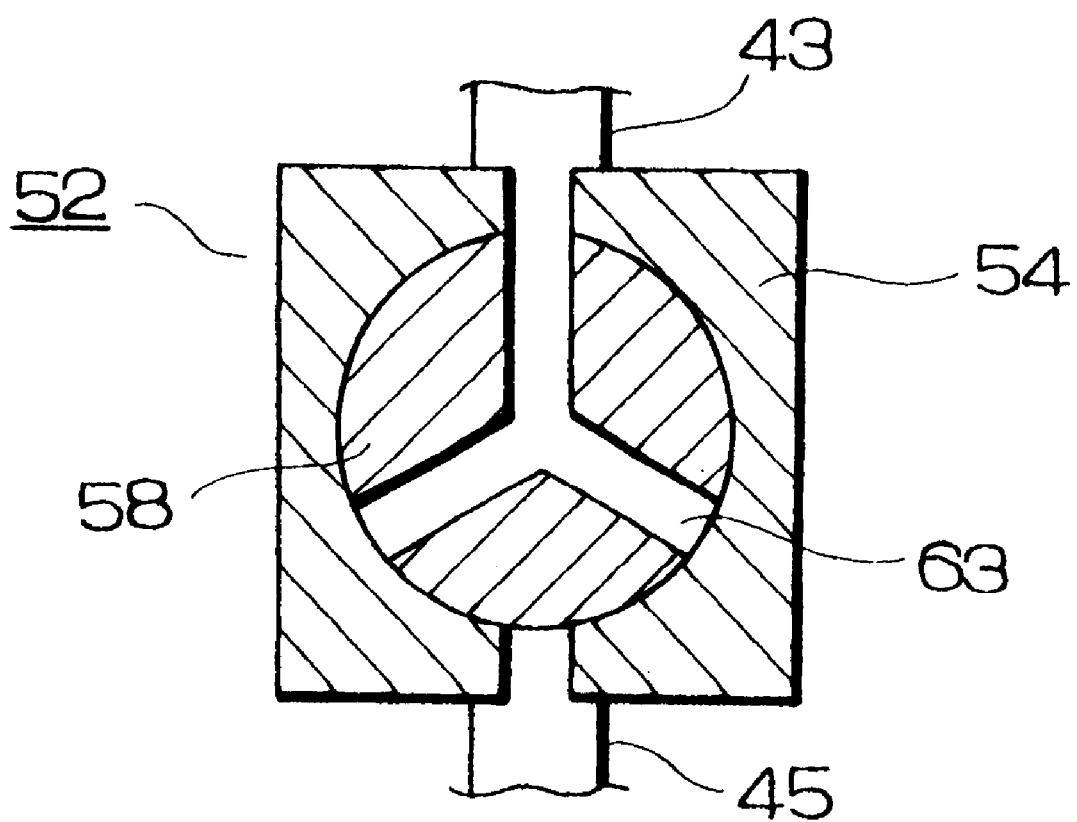
FIG. 6 is a schematic diagram showing the structure of a rotary valve used in a flux supply device according to a third embodiment of the present invention.

FIG. 6 is a diagram schematically showing the structure of the valve body of a rotary valve used in a flux supply device according to a third embodiment of the present invention The valve body 58 of the rotary valve 52 of this embodiment has a radial through hole 63 radially extending in three directions from the center and having three open ends. When the valve 58 thus constructed is rotated in one direction about an axis perpendicular to the paper of FIG. 6, the constant amount of liquid flux held in the radial through hole 63 can be supplied from the third pipe 43 into the fifth pipe 45, with the third pipe 43 and the fifth pipe 45 completely shut off from each other.

Figure 7:
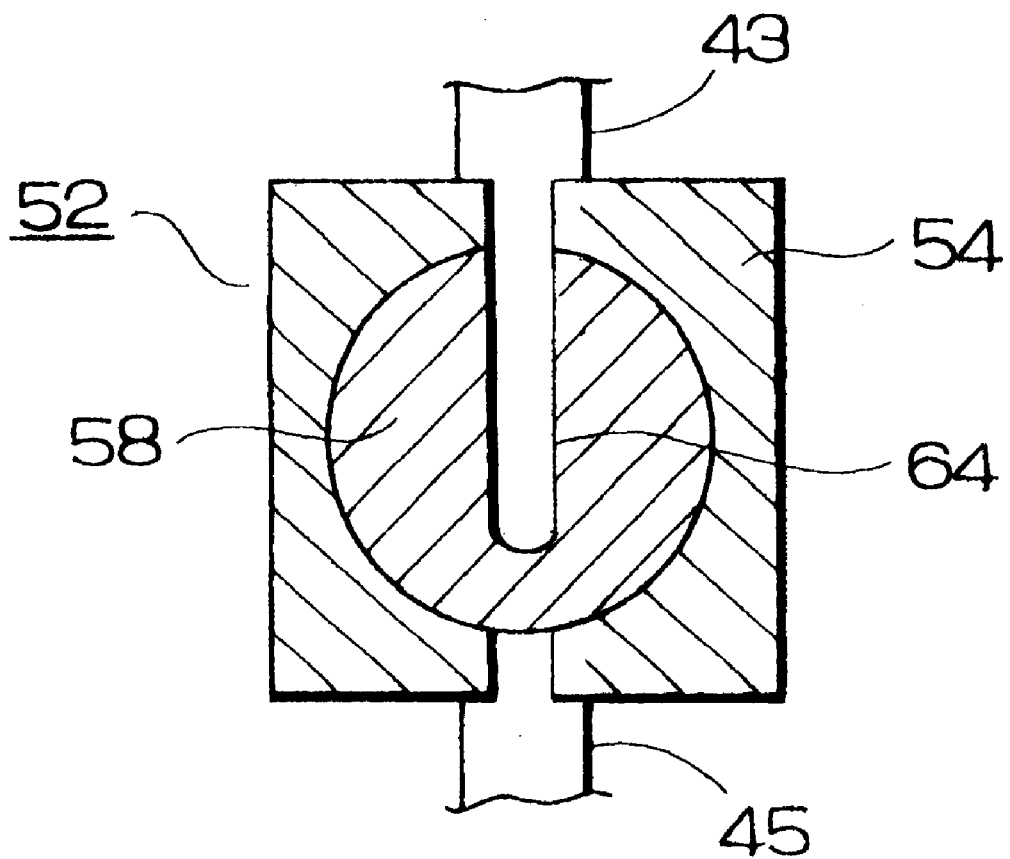
FIG. 7 is a schematic diagram showing the structure of a rotary valve used in a flux supply device according to a fourth embodiment of the present invention.

FIG. 7 is a diagram schematically showing the valve body of a rotary valve used in a flux supply device according to a fourth embodiment of the present invention.

Referring to the diagram, the valve body 58 has a linear hole 64 having only one open end. When the valve body 58 is rotated in a given direction on an axis perpendicular to the paper of FIG. 7, the liquid flux held in the linear hole 64 can be supplied from the third pipe 43 into the fifth pipe 45, with the third pipe 43 and the fifth pipe 45 completely shut off from each other.

While open holes of various shapes can be formed in the valve body 58 as shown above, it should be understood that the same effect can be obtained as long as the hole has at least one open end and is so constructed as not to allow the third pipe 43 and the fifth pipe 45 to communicate directly with each other at any rotating positions.

While the invention has been described in detail, the foregoing description is in all aspects illustrative and not restrictive. It is understood that numerous other modifications and variations can be devised without departing from the scope of the invention.

What is claimed is:

1. A flux supply device for supplying a mixed gas composed of a gas flux and a combustible gas to a brazing apparatus, said flux supply device comprising:

a flux storage tank for storing a liquid flux;

a gas blow-in pipe for blowing the combustible gas into the liquid flux stored in said flux storage tank;

a liquid flux supply pipe for supplying the liquid flux into said flux storage tank, said liquid flux supply pipe having its lower end located above the lower end of said gas blow-in pipe;

a liquid replenishing portion for holding the liquid flux, said liquid replenishing portion being located above said liquid flux supply pipe and having its lower end opened;

a first automatically opened/closed valve connected to the lower end of said liquid replenishing portion;

a second automatically opened/closed valve connected to the upper end of said liquid flux supply pipe;

a liquid holding portion for holding the liquid flux, said liquid holding portion being connected between the lower end of said first automatically opened/closed valve and the upper end of said second automatically opened/closed valve; and a control portion for controlling said first automatically opened/closed valve and said second automatically opened/closed valve so that one automatically opens and closes and then the other automatically opens and closes, alternately and repeatedly, and so that the amount of the liquid flux that can be supplied from said liquid holding portion into said liquid flux supply pipe while said first automatically opened/closed valve and said second automatically opened/closed valve are opened and closed in a given time period is larger than the amount of the liquid flux consumed while the mixed gas is sent out from said flux storage tank in said given time period.

2. The flux supply device according to claim 1, wherein said control portion can change the timing for opening and closing said first automatically opened/closed valve and said second automatically opened/closed valve.

3. The flux supply device according to claim 1, wherein said control portion provides control so that a given time passes from when one of said first automatically opened/closed valve and said second automatically opened/closed valve is closed to when the other is opened.

4. The flux supply device according to claim 2, wherein said control portion provides control so that a given time passes from when one of said first automatically opened/closed valve and said second automatically opened/closed valve is closed to when the other is opened.

5. The flux supply device according to claim 1, wherein the lower end of the liquid flux supply pipe has a predetermined height within the flux storage tank, and wherein the liquid flux in the flux storage tank has an upper surface that is maintained at approximately the height of the lower end of the liquid flux supply pipe.

6. A flux supply device for supplying a mixed gas composed of a gas flux and a combustible gas to a brazing apparatus, said flux supply device comprising:

a flux storage tank for storing a liquid flux;

a gas blow-in pipe for blowing the combustible gas into the liquid flux stored in said flux storage tank;

a liquid flux supply pipe for supplying the liquid flux into said flux storage tank, said liquid flux supply pipe having its lower end located above the lower end of said gas blow-in pipe;

a liquid replenishing portion for holding the liquid flux, said liquid replenishing portion being located above said liquid flux supply pipe and having its lower end opened;

a rotary valve connected between the upper end of said liquid flux supply pipe and the lower end of said liquid replenishing portion; and a control portion for providing control to rotate said rotary valve so that an open hole formed in the body of said rotary valve alternately communicates with said liquid flux supply pipe and said liquid replenishing portion, and so that the amount of the liquid flux that can be supplied from said open hole into said liquid flux supply pipe while said rotary valve rotates in a given time period is larger than the amount of the liquid flux consumed while the mixed gas is sent out from said flux storage tank in said given time period.

7. The flux supply device according to claim 6, wherein the lower end of the liquid flux supply pipe has a predetermined height within the flux storage tank, and wherein the liquid flux in the flux storage tank has an upper surface that is maintained at approximately the height of the lower end of the liquid flux supply pipe.

8. A flux supply device for supplying a mixed gas composed of a gas flux and a combustible gas to a brazing apparatus, said flux supply device comprising:

a flux storage tank for storing a liquid flux;

a gas blow-in pipe for blowing the combustible gas into the liquid flux stored in said the storage tank, the gas blow-in pipe having a lower end;

a replenishing tank for holding further liquid flux, the replenishing tank being located above the flux storage tank;

means for providing a flux flow path from the replenishing tank to a discharge opening in the flux storage tank, the discharge opening being located above the lower end of the gas blow-in pipe;

an automatically opened/closed upper valve in the flux flow path;

an automatically opened/closed lower valve in the flux flow path; and control means for controlling the upper and lower valves so that one of the valves automatically opens and closes and then the other valve automatically opens and closes in a repeating sequence, with one of the valves always being closed, and so that the amount of liquid flux that can be supplied from said replenishing tank into the flux storage tank while the valves are automatically opened and closed, in a given time period, is larger than the amount of the liquid flux consumed while the mixed gas is sent out from said flux storage tank in the given time period.

9. The flux supply device according to claim 8, wherein the control means can change the timing for opening and closing the valves.

10. The flux supply device according to claim 8, wherein the control means provides control so that a given time passes from when one of the valves is closed to when the other is opened.

11. The flux supply device according to claim 8, wherein the discharge opening of the means for providing a flux flow path is disposed at a predetermined height within the flux storage tank, and wherein the liquid flux in the flux storage tank has an upper surface that is maintained at approximately the height of discharge opening.

12. A flux supply device for supplying a mixed gas composed of a gas flux and a combustible gas to a brazing apparatus, said flux supply device comprising:

a flux storage tank for storing a liquid flux;

a gas blow-in pipe for blowing the combustible gas into the liquid flux stored in the flux storage pipe, the gas blow-in pipe having a lower end;

means for providing a flux flow path from the replenishing tank to a discharge opening in the flux storage tank, the discharge opening being located above the lower end of the gas blow-in pipe;

a rotary valve in the flux flow path, the rotary valve having a rotatable valve body with an elongated cavity that does not extend through the valve body along a straight line; and control means for providing control to rotate the valve body so that the cavity therein alternately communicates with upper and lower portions of the flux flow path, without communicating with the upper and lower portions of the flux flow path simultaneously.

13. The flux supply device according to claim 12, wherein the control means provides control so that the amount of the liquid flux that can be supplied from the cavity to the lower portion of the flux flow path while the valve body rotates in a given time period is larger than the amount of liquid flux consumed while the mixed gas is sent out from the flux storage tank in the given time period.

* * * * *